United States Patent [19]
Miyama

[11] Patent Number: 5,268,240
[45] Date of Patent: Dec. 7, 1993

[54] UNIT SYSTEM-ASSEMBLED FUEL CELL POWER GENERATION SYSTEM

[75] Inventor: Harumi Miyama, Kawasaki, Japan

[73] Assignee: Fuji Electric Co., Ltd., Kawasaki, Japan

[21] Appl. No.: 913,721

[22] Filed: Jul. 16, 1992

[30] Foreign Application Priority Data

Jul. 17, 1991 [JP] Japan .................................. 3-175629

[51] Int. Cl.$^5$ .............................................. H01M 8/04
[52] U.S. Cl. ........................................ 429/23; 429/26; 429/34
[58] Field of Search ....................... 429/34, 12, 22, 23, 429/13, 26, 18

[56] References Cited

U.S. PATENT DOCUMENTS

| | | | |
|---|---|---|---|
| 4,517,263 | 5/1985 | Reiss et al. | 429/26 X |
| 4,670,357 | 6/1987 | Taylor | 429/12 |
| 5,202,194 | 4/1993 | Vanberg, Jr. | 429/13 |

Primary Examiner—John S. Maples
Attorney, Agent, or Firm—Spencer, Frank & Schneider

[57] ABSTRACT

A unit system-assembled fuel cell power generation system integrated so as to permit transportation in an assembled state, comprises (A) a common stage; and (B) a plurality of unit systems separated by function which are integrated and arranged on the common stage in such a manner that the system can be transported in an assembled state. The plurality of unit systems each include one or more components and have a frame with an individual stage on which the or each component is assembled. The plurality of unit systems separated by function comprise a fuel cell unit system, a fuel reforming unit system, a cooling water unit system, a temperature elevating unit system, and a system controlling unit system. A space for operation is provided between any adjacent two of the frames. The space serves as a space where a piping and a wiring connecting the unit systems on the individual stages one with another have connections.

6 Claims, 4 Drawing Sheets

UNIT SYSTEM-ASSEMBLED FUEL CELL POWER GENERATION SYSTEM

BACKGROUND OF THE INVENTION

1. Field of the Invention

The present invention relates to a fuel cell power generation system and more particularly to a unit system-assembled fuel cell power generation system in which functionally divided unit systems such as a fuel cell system, a fuel reforming system, a cooling water system, a starting temperature elevating system and a system controlling system are integrated in such a manner that the assembled power generation system can be transported in the assembled state. The present invention also relates to an improvement in the assembled structure of such a power generation system.

2. Description of the Prior Art

FIG. 1 is a block diagram showing a conventional arrangement of functionally divided equipments for a fuel cell power generation system with an output on the order of about 50 kW. As shown in FIG. 1, the location or area where a power generation system 100 is installed is separated into an apparatus room 101, a control room 102 adjacent to the apparatus room 101, and an installation room 103 surrounding the apparatus room 101 and the control room 102.

In the apparatus room 101 are arranged a cell stack 104 including a plurality of single cells (not shown) superimposed one on another, a fuel reformer 105 which is connected to the cell stack, reforms fuel such as liquid natural gas from a fuel source (not shown) and supplies the reformed fuel to the cell stack, and an air blower 106 which is connected to the cell stack and supplies reactant air to the cell stack. A system controlling system 107 is arranged in the control room 102. The system controlling system 107 includes a power inverter 108 which is connected to the cell stack 104 and invert the output direct current from the cell stack into alternating current, a distribution board 109 connected to the inverter and for supplying current to auxiliary machinery or auxiliaries (not shown), a metering and controlling apparatus 110 and the like.

On the other hand, the installation room 103 contains a cooling apparatus 111 for cooling the installation room 103, a starter temperature elevating apparatus 112 for elevating the temperatures of the cell stack at the time of starting the operation of the power generation system, a waste heat utilizing apparatus 113 for utilizing heat generated by the equipments in the installation room and the like. Also, an auxiliary power source 114 is provided in the installation room 103. The apparatuses are connected to each other with pipes and/or lead wires, thus giving a power generation system or plant.

The fuel cell power generation system constructed as described above requires a vast space when it is under performance test at the place where it has been produced. It is necessary for such a system once assembled to be disassembled before it can be transported to a spot where it is to be used and reassembled there to give an integrated whole system. The assembling, disassembling and reassembling require a large number of man-hour and take many days.

A conventional approach to cope with the aforementioned problems is to develop a fuel cell power generation system having a construction which permits assembling the system as a whole on a common stage and transportation of the system as an integrated body together with the stage. This construction minimizes space for assembling or testing on the production site and makes the disassembling before transportation and the reassembling after transportation unnecessary, so that it could be expected to reduce space, power and time to considerable extents.

However, the assembling the whole system involves a series of steps of assembling operations which should be performed within a narrow space. As a result, a long time is required for assembling the whole system, which will cancel the merit of reduced operation time obtained by the elimination of the step of disassembling the once integrated whole system into its components before transportation, and the step of reassembling the components into the integrated whole system after transportation. This is a great obstacle for the continuous production of fuel cell power generation systems at high efficiencies.

When one or more defective unit systems or parts are found in performance tests after the power generation system has once been assembled or troubles occur during the operation of the power generation system, the integrated whole system must be disassembled to some extent for inspection and repairs. A considerably long time will thus be necessary for disassembling and repairing the system. Also, a long time will be necessary in which the operation of the system is to be stopped for the inspection and repairs. Therefore, not only the supply of power will be impeded but also the operation efficiency of the power generation system will be decreased.

SUMMARY OF THE INVENTION

Therefore, an object of the present invention is to provide a fuel cell power generation system which can be assembled easily and produced continuously at high efficiencies and which can be inspected and repaired easily so that time can be saved.

As a result of intensive investigation with view to solving the aforementioned problems, there is provided (I) a unit system-assembled fuel cell power generation system integrated so as to permit transportation in an assembled state, comprising:

(A) a common stage; and (B) a plurality of unit systems having specified functions, respectively, differing one from another, the plurality of unit systems each including one or more components necessary for achieving the specified functions and having:

(B-1) a frame, and (B-2) an individual stage associated with the frame, and on which one or more components are assembled;

wherein the plurality of unit systems on the respective individual stages are integrated and arranged on the common stage in such a manner that the whole system can be transported in an assembled state.

(II) Here, in the unit system-assembled fuel cell power generation system (I), the plurality of unit systems may comprise a fuel cell unit system, a fuel reforming unit system, a cooling water unit system, a temperature elevating unit system, and a system controlling unit system.

(III) The power generation system (I) may further comprise (C) a piping and an electric wiring connecting the plurality of unit systems one with another, and (D)

a plurality of connections inserted in the piping and the electric wiring.

(IV) The power generation system (III) may have a space for operation between any adjacent two of the frames, with the connections being positioned in the space.

(V) The power generation system (II) may further comprise (C) a piping and an electric wiring connecting the plurality of unit systems one with another, and (D) a plurality of connections inserted in the piping and the electric wiring.

(VI) The power generation system (V) may have a space for operation between any adjacent two of the frames, with the connections being positioned in the space.

In the unit system-assembled fuel cell power generation system of the present invention having the aforementioned construction, the arrangement of the components of the unit systems on the corresponding individual stages with frames, respectively, which stages in turn are arranged integrally on the common stage, enables the assembling operations for assembling respective unit systems of the power generation system to be performed in parallel with ease and speedily, with utilizing a large space surrounding the frames from which the components of the whole system grouped into unit systems by function are accessible to the workers or operators. Further, the system-wide or final assembling operation is limited to the operation of connecting the unit systems one with another, or connecting the piping and wiring among the unit systems, which facilitates the assembling operation to save time and which renders the power generation system suitable for continuous production. The power generation system arranged integrally on the common stage can be transported as a whole. Such a system can be separated and disassembled with ease by operating in a reversed order to the assembling operation, resulting in that disassembling, inspection, and rrepairing of the system can be made easily, thus rendering the operations time-saving.

Further, the provision of operation space for the assembling operation between the frames of any two adjacent unit systems and the positioning of the connections, which connect the unit systems arranged on the common stage with each other through the piping and the electric wiring, within the operation space make it possible to perform the connecting operation of the piping and the wiring extending among the unit systems at high efficiencies and also to utilize the operation space as a space for performing the inspection and repairs to facilitate the maintenance of the power generation system.

The above and other objects, effects, features and advantages of the present invention will become more apparent from the following description of embodiments thereof taken in conjunction with the accompanying drawings.

DESCRIPTION OF PREFERRED EMBODIMENTS

Hereafter, a unit system-assembled fuel cell power generation system according to one embodiment of the present invention will be explained in greater detail with reference to the accompanying drawings.

Figure 1:
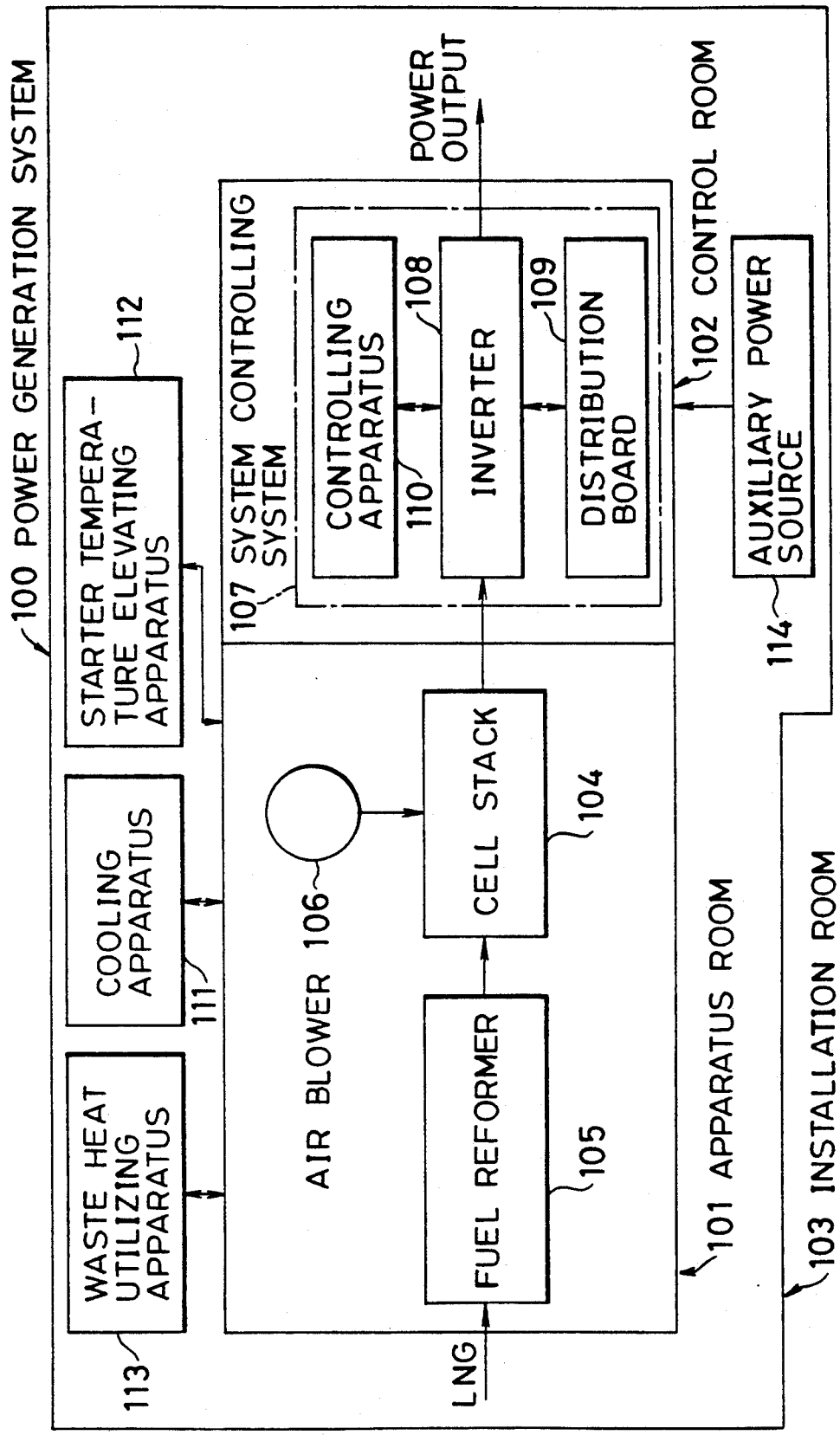
FIG. 1 is a block diagram showing a conventional arrangement of functionally divided appliances for a fuel cell power generation system with an output on the order of about 50 kW.
Figure 2:
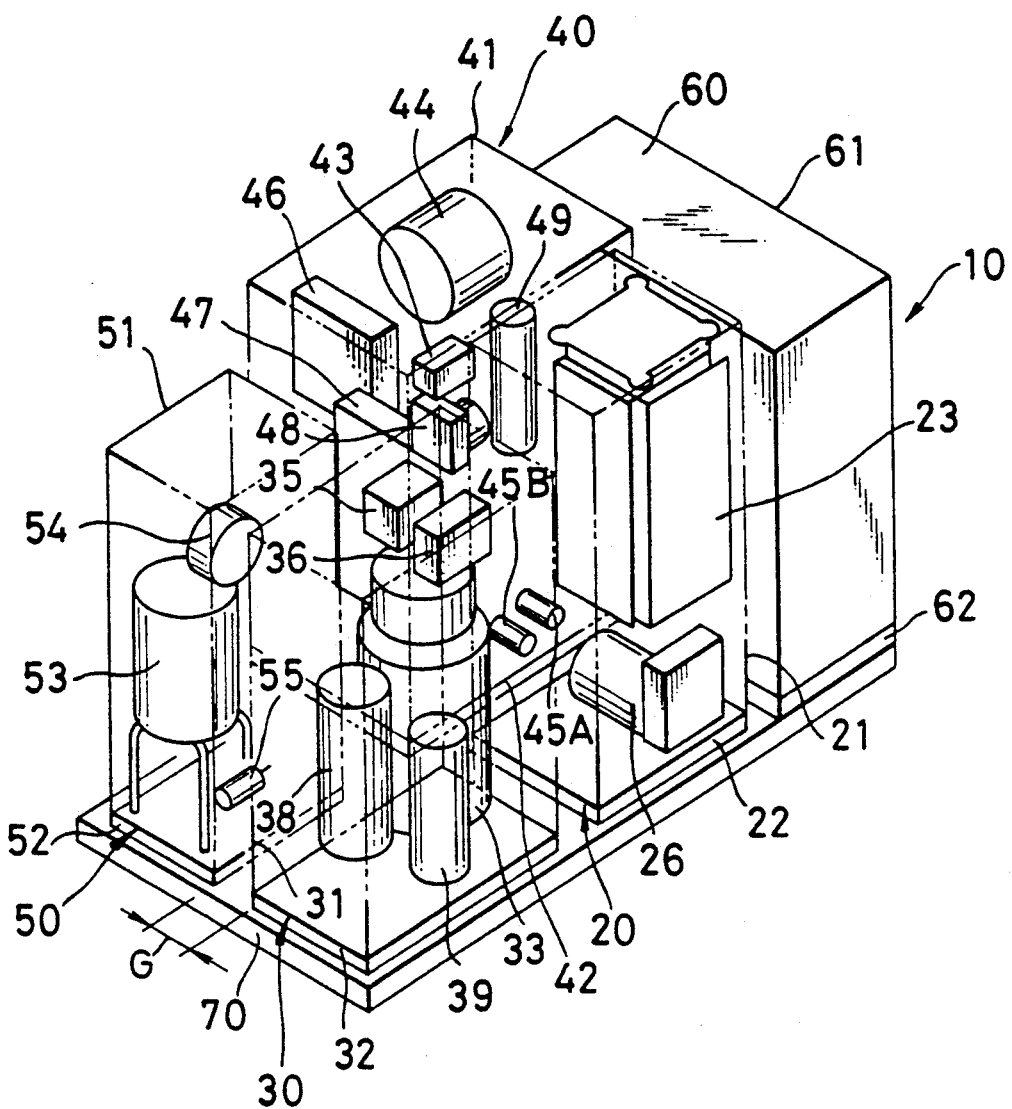
FIG. 2 is a schematic, simplified perspective view showing a unit system-assembled fuel cell power generation system according to an embodiment of the present invention.
Figure 3A:
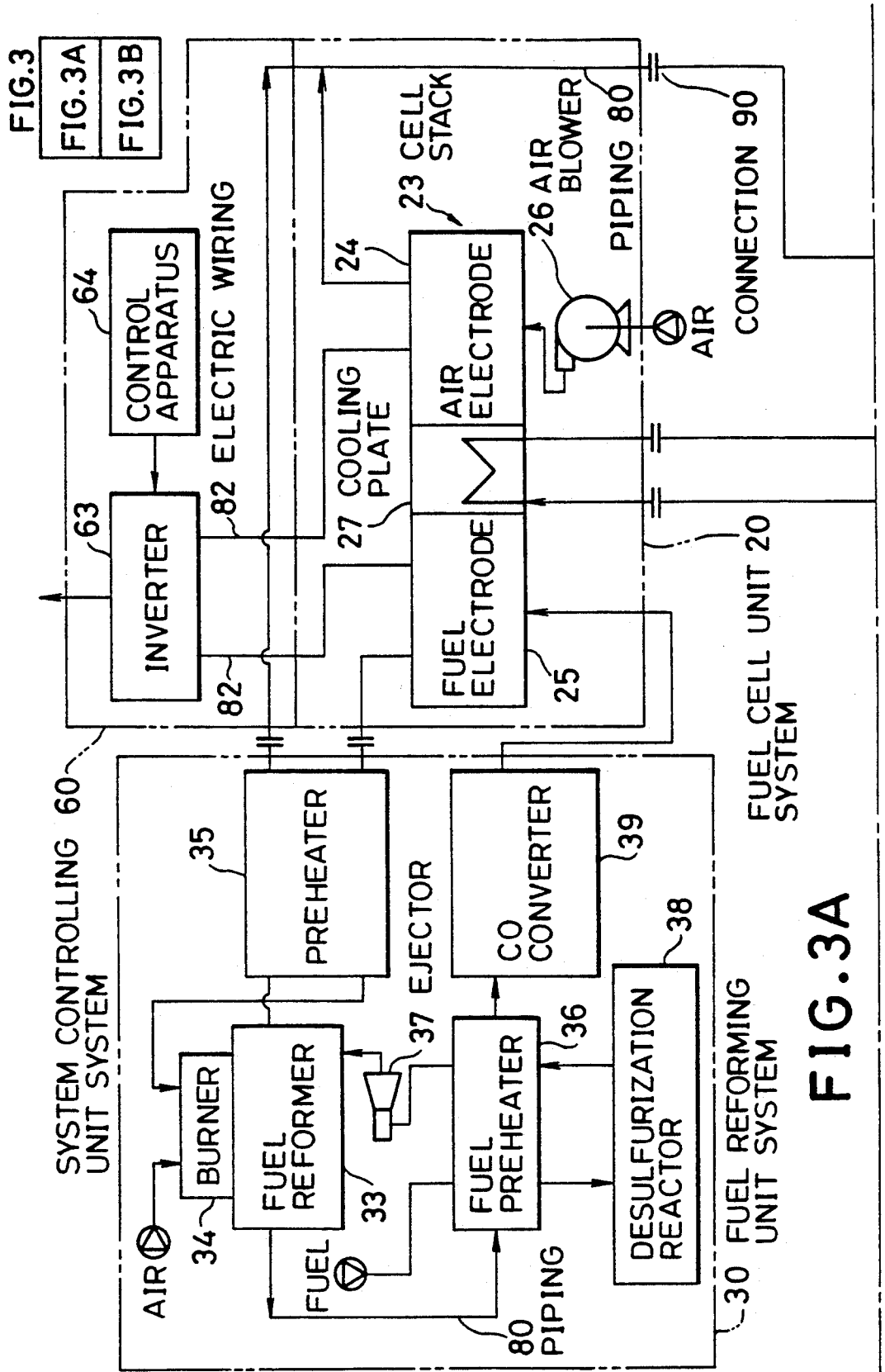
FIG. 3A is a block diagram showing one part of an arrangement of components of a unit system-assembled power generation system according to an embodiment of the present invention, with illustrating how to divide the components thereof into unit systems by function.
Figure 3B:
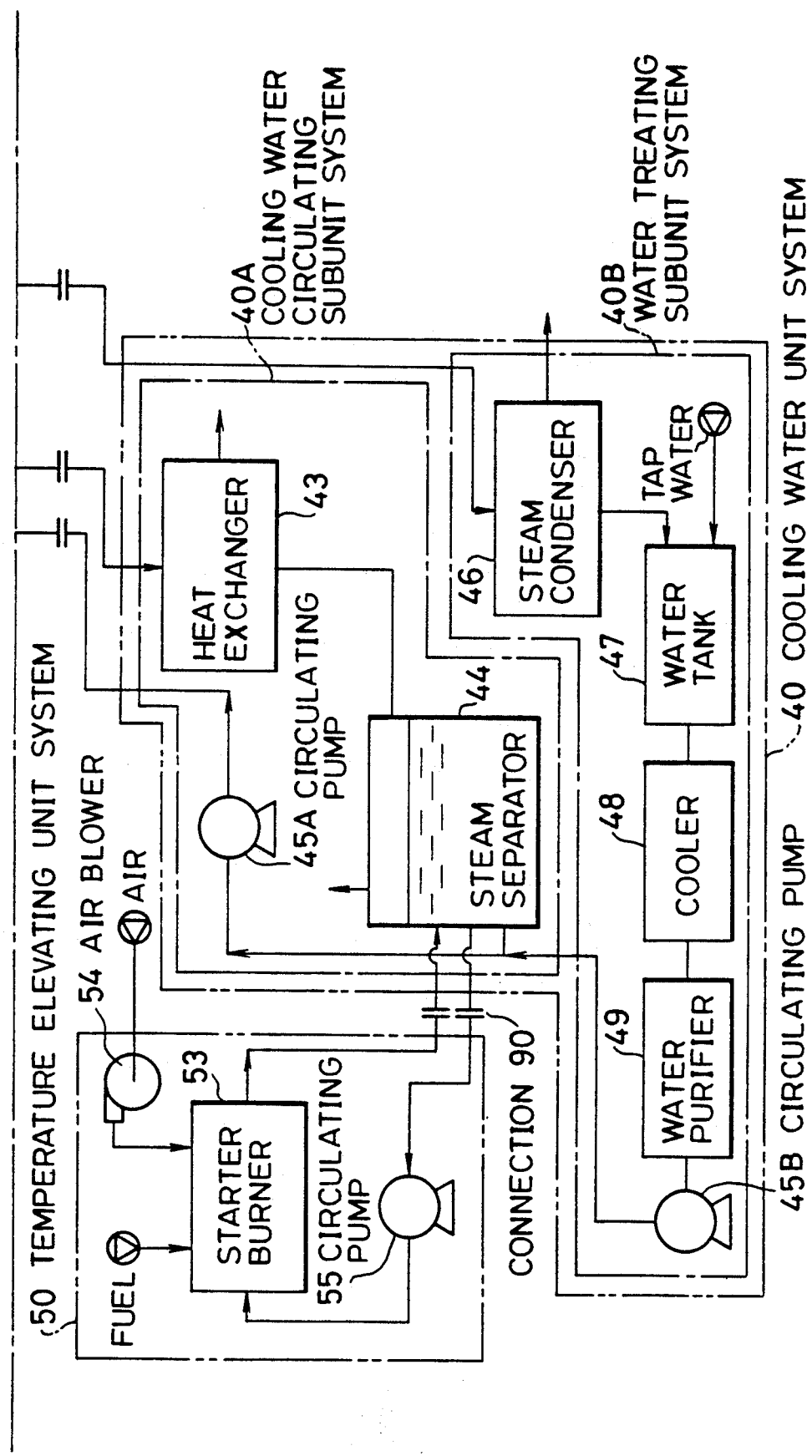
FIG. 3B is a block diagram showing the other part of an arrangement of components of a unit system-assembled power generation system according to an embodiment of the present invention, with illustrating how to divide the components thereof into unit systems by function.

FIG. 2 is a schematic, simplified perspective view showing a unit system-assembled fuel cell power generation system according to an embodiment of the present invention; and FIGS. 3A and 3B are block diagrams showing one part and the other part, respectively, of an arrangement of components of a unit system-assembled power generation system according to an embodiment of the present invention, with illustrating how to divide the components thereof into unit systems by function. As shown in FIGS. 2, 3A and 3B, a unit system-assembled fuel cell power generation system 10 according to the instant embodiment includes five unit systems separated by function, i.e., a fuel cell unit system 20, a fuel reforming system 30, a cooling water unit system 40, a temperature elevating unit system 50, and a system controlling unit system 60. FIG. 3A shows the unit systems 20, 30 and 60 while FIG. 3B shows the unit systems 40 and 50. The unit systems are shown in FIGS. 3A and 3B separately for the convenience of illustration. The unit systems 20, 30, 40, 50 and 60 each have frames 21, 31, 41, 51 and 61, respectively, which have individual stages 22, 32, 42, 52 and 62, respectively. The components of the power generation system which have been grouped into unit systems by function and assembled on the respective individual stages are fixed by a suitable conventional means such as bolts and nuts on a common stage 70 in assembled states.

The fuel cell unit system 20 includes a cell stack 23 comprised of a plurality of single cells superimposed one on another, each having an air electrode 24 and a fuel electrode 25. The system 20 may contain more than one cell stacks. In the instant embodiment, the system 20 has a single cell stack for the simplicity of the explanation. The fuel cell unit system 20 also includes an air blower 26 which is connected to the cell stack 23 and supplies reactant air to the air electrodes 24 of the single cells in the cell stack 23. The cell stack 23 also has one or more cooling plates 27 laminated for every predetermined number of the single cells for cooling them. The cell stack 23 and the air blower 26 are arranged on the individual stage 22 and housed in the frame 21, which is then arranged on the common stage 70. The fuel reforming unit system 30 includes a fuel reformer 33 provided with a burner 34. The reformer 33 is connected to a preheater 35 which in turn is connected to the fuel electrodes of the cell stack 23 and preheats exhaust hydrogen gas from the air electrodes 25 using exhaust combustion gas from the fuel reformer 35. The fuel reforming unit system 30 also includes a fuel preheater 36 and an ejector 37 connected to the fuel preheater 36 and the fuel reformer 33. The fuel preheater 36 preheats a fuel from a fuel source (not shown) and sends to the fuel reformer 33 through the ejector 37. The fuel preheater is provided with a purifier or desulfurization reactor 38 which removes sulfur from the fuel. The fuel preheater 36 is connected to the fuel electrodes 25 in the fuel cell unit system 20 through a CO converter 39, which converts CO in the fuel gas into $CO_2$ gas. The fuel reformer 33, the burner 34, the preheater 35, the fuel preheater 36, the ejector 37, the desulfurization reactor 38, and the CO converter 39, which have been incorporated in the frame 31 and arranged on the individual stage 32 in advance, are arranged on the common stage 70 in that state.

The aforementioned arrangement is designed for the case where natural gas, for example, is used as the fuel gas. When methanol is used as the fuel, the desulfurization reactor 38 and the CO converter 39 may be omitted, and in this case the fuel preheater 36 serves as a carburetor. Combustion gas generated in the fuel cell unit system 20 is introduced in the cell stack 23 where it is reacted with reactant air electrochemically. After a predetermined amount of hydrogen is consumed, the combustion gas from the cell stack is sent to the burner 34 of the fuel reformer 33 through the preheater 35, and the remaining hydrogen is burned to give heat of combustion, which is utilized as heat of reaction for reforming the fuel while exhaust gas from the burner 34 is utilized as the heating medium of the preheater 35.

The cooling water unit system 40 includes a cooling water circulating subunit system 40A and a water treating subunit system 40B on the individual stage 42 in the frame 41. The cooling water subunit system 40A includes a heat exchanger 43, which is connected to the cooling plate or plates 27 of the cell stack 23 and circulates cooling water thereto, a steam seperator 44 connected on one hand to the heat exchanger 43 and on the other hand to the water treating subunit system 40B, and a circulating pump 45A. The water treating subunit system or apparatus 40B replenishes cooling water lost from the circulation when supplying steam separated in the steam separator 44 as reaction water to the fuel reformer 33.

The water treating apparatus 40B includes a steam condenser 46, a water tank 47, a cooler 48, an ion exchange type water treating apparatus (water purifier) 49, and a pump 45B. The steam condenser 46, connected on one hand to the fuel reformer 33 and the air electrodes of the cell stack 23 and on the other hand to the steam separator 44 through the water tank 47, the cooler 48 and the water purifier 49, recovers steam in the exhaust combustion gas and the air off-gas from the cell stack, condenses the steam into water, and supplies the water to the water tank 47. The water tank 47 stores water from the steam condenser 46. Tap water can be added, if desired. The component devices are assembled in the frame 41 in advance before they can be arranged on the common stage 70. The heat exchanger 43 and the steam condenser 46 also function as a waste heat utilizing installment as well. They may be constructed as independent unit systems or may be included in other unit systems.

The temperature elevating system 50 includes a starter burner 53, an air blower 54, which is connected to the starter burner 53 and supplies air thereto, and a circulating pump 55, which circulates cooling water. The temperature elevating system 50 heats and circulates cooling water at the time of starting the operation of the power generation system so that the single cells can be preheated to a temperature at which they can start to operate. The component devices are assembled on the individual stage 52 in the frame 51 before they can be arranged at respective predetermined positions on the common stage 70.

The system controlling unit system 60 includes an inverter 63, which supplies the power generated by the single cells to a load under control, and a control apparatus 64, which meters and controls the state of operation of the whole system inclusive of auxiliaries so as to correspond to the loaded power. These components are assembled on the individual stage 62 in the frame 61 at respective predetermined positions before they can be arranged on the common stage 70. The frame 61 of the system controlling unit system 60 is of a metal-clad type and has a housing. Of the four squarely arranged frames, the frame 21 of the fuel cell unit system 20 and the frame 41 of the cooling water unit system 40 are arranged in contact with the frame 61, which construction facilitates protection and inspection of the meters, and switching operations thereof.

The aforementioned unit systems divided by function and assembled separately, after having been arranged on the common stage 70, are then integrated by connecting a piping 80 and an electric wiring 82 extending among the unit systems and connecting them one with another with connections 90. On this occasion, the system-wide assembling operation can be performed at higher efficiencies by providing a distance or gap G in any two adjacent frames and connecting the connections 90 of the piping 80 and the wiring 82 in this space. Upon the system-wide assembling operation, the housings of the frames do not have to be fixed solidly to the frames from the beginning but the housings may be attached to the corresponding frames just before the completion of the system-wide assembling operation. This makes it possible to use the spaces in the two adjacent frames together with the space between the frames upon the system-wide assembling operation, resulting in that the distance or gap G may be smaller than is otherwise necessary for a worker to come in between the frames. Therefore, size reduction of the fuel cell power generation system is not hampered.

In the aforementioned embodiment, a 50 kW unit system-assembled fuel cell power generation system can be realized whose size in the outer configuration after the system-wide assembling operation is 2 m or less in width, 3 m or less in length and about 2 m in height. According to the present invention, it has become clear that a fuel cell power generation system of a larger capacity than the aforementioned 50 kW type system can be transported in the assembled state. Since the assembling operations of the unit systems separated by function can be performed in parallel and efficiently with utilizing large space outside the frames, and since the system-wide assembling operation is limited to the operation of connecting the unit systems one with another, it is possible according to the present invention to reduce the number of days required for the assembling operation considerably as compared with the conventional fuel cell power generation system of which all the components have to be assembled on the common stage. Further, the fuel cell power generation system of the present invention suffers less trouble in inspection after the completion of the system-wide assembling so that the number of man-hour for repairs of defective portions can be reduced since the inspection of devices, piping and wiring can be performed unit system by unit system.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A unit system-assembled fuel cell power generation system integrated so as to permit transportation in an assembled state, comprising:
    (A) a common stage; and
    (B) a plurality of unit systems having various functions, respectively, differing one from another, said plurality of unit systems each including one or more components necessary for achieving said various functions and having:
        (B-1) a frame, and
        (B-2) an individual stage associated with said frame, and on which said one or more components are assembled;
    wherein said plurality of unit systems on said respective individual stages are integrated and arranged on said common stage in such a manner that the whole system can be transported in an assembled state.

2. A unit system-assembled fuel cell power generation system as claimed in claim 1, wherein said plurality of unit systems comprise a fuel cell unit system, a fuel reforming unit system, a cooling water unit system, a temperature elevating unit system, and a system controlling unit system.

3. A unit system-assembled fuel cell power generation system as claimed in claim 1, wherein said power generation system further comprises:
    (C) a piping and an electric wiring connecting said plurality of unit systems one with another, and
    (D) a plurality of connections inserted in said piping and said electric wiring.

4. A unit system-assembled fuel cell power generation system as claimed in claim 3, wherein said power generation system is provided with a space for an assembling or disassembling operation between any adjacent two of said frames, with said connections being positioned in said space.

5. A unit system-assembled fuel cell power generation system as claimed in claim 2, wherein said power generation system further comprises:
    (C) a piping and an electric wiring connecting said plurality of unit systems one with another, and
    (D) a plurality of connections inserted in said piping and said electric wiring.

6. A unit system-assembled fuel cell power generation system as claimed in claim 5, wherein said power generation system is provided with a space for an assembling or disassembling operation between any adjacent two of said frames, with said connections being positioned in said space.

* * * * *